United States Patent [19]

Tuason, Jr. et al.

[11] Patent Number: 4,980,193
[45] Date of Patent: Dec. 25, 1990

[54] MICROCRYSTALLINE CELLULOSE-BASED STABILIZER SYSTEM FOR DRY MIX INSTANT CHOCOLATE DRINK

[75] Inventors: Domingo C. Tuason, Jr., Bensalem; Emanuel J. McGinley, Morrisville, both of Pa.

[73] Assignee: FMX Corporation, Philadelphia, Pa.

[21] Appl. No.: 438,137

[22] Filed: Nov. 16, 1989

Related U.S. Application Data

[63] Continuation-in-part of Ser. No. 208,344, Jun. 17, 1988, abandoned.

[51] Int. Cl.⁵ .................... A23L 1/522; A23L 1/534; A23G 1/00
[52] U.S. Cl. .................................... 426/654; 426/584; 426/593; 426/661; 426/573
[58] Field of Search ............... 426/584, 593, 654, 661, 426/573, 306, 330.3

[56] References Cited

U.S. PATENT DOCUMENTS

| | | | |
|---|---|---|---|
| 3,013,881 | 12/1961 | Carlson et al. | 99/24 |
| 3,027,257 | 3/1962 | Shenkenberg | 99/24 |
| 3,403,028 | 9/1968 | Stancioff et al. | 99/26 |
| 3,560,218 | 2/1971 | Whelan | 99/26 |
| 3,573,058 | 3/1971 | Tiemstra | 99/1 |
| 3,684,523 | 8/1972 | McGinley et al. | 426/573 |
| 3,860,730 | 1/1975 | Warkentin | 426/171 |
| 3,928,252 | 12/1975 | Rigler et al. | 426/573 |
| 4,199,610 | 4/1980 | Hughes et al. | 426/590 |
| 4,216,242 | 8/1980 | Braverman | 426/573 |
| 4,311,717 | 1/1982 | McGinley | 426/584 |
| 4,415,599 | 11/1983 | Bos | 426/573 |
| 4,859,484 | 8/1989 | Bielskis et al. | 426/573 |

FOREIGN PATENT DOCUMENTS 961398 8/1960 United Kingdom .

*Primary Examiner*—Donald E. Czaja
*Assistant Examiner*—Helen Pratt
*Attorney, Agent, or Firm*—Stanford M. Back; Patrick C. Baker; Richard E. Elden

[57] ABSTRACT

A dry powder stabilizing agent useful for suspending cocoa solids in dry mix instant chocolate drink formulations that are reconstituted with hot water. The stabilizing agent is a coprocessed, codried powdered composition containing colloidal microcrystalline cellulose, a minor amount of starch, and a non-thickening water-soluble diluent such as maltodextrin, whey or non-fat dry milk.

13 Claims, No Drawings

MICROCRYSTALLINE CELLULOSE-BASED STABILIZER SYSTEM FOR DRY MIX INSTANT CHOCOLATE DRINK

CROSS-REFERENCE TO RELATED APPLICATION

This application is a continuation-in-part of Ser. No. 208,344, filed June 17, 1988 in the names of D. C. Tuason, et al.

BACKGROUND OF THE INVENTION

The invention relates to a dry powder composition containing microcrystalline cellulose, useful as a stabilizing agent in the rapid dispersion and suspension in aqueous media of certain dry, powdered materials, and especially cocoa particles in instant chocolate drink mixes. More particularly, the stabilizing agent is a spray-dried composition containing colloidal microcrystalline cellulose, starch, and a water-soluble diluent for the microcrystalline cellulose.

Dry mix instant chocolate drink products are powdered formulations that, when mixed with water or milk, yield a chocolate drink. A serious disadvantage of many such chocolate drinks is that the cocoa particles settle very rapidly after an initial stirring, forming a chocolate sediment at the bottom of the container and giving the liquid a dilute, watery flavor.

Commercially-prepared chocolate drinks typically employ a stabilizer that functions as a suspending agent for the cocoa particles. Colloidal microcrystalline cellulose, such as the carboxymethyl cellulose-coated microcrystalline cellulose (MCC) described in Durand et al., U.S. Pat. No. 3,539,365 and sold by FMC Corporation under the brand names Avicel ® RC and Gelstar ®, is one such stabilizing agent. The heat-sterilized artificial dairy drink described in McGinley et al., U.S. Pat. No. 3,684,523 utilizes the colloidal MCC of Durand et al. '365, but uses high shear mixing devices in the preparation. See, also, for example, U.S. Pat. No. 3,563,798 which describes the use of high shear devices, in this case for making gum substitutes from starch, as well as U.S. Pat. No. 4,216,242 directed to making freezable gel confections with high shear mixers.

Colloidal microcrystalline cellulose must be activated, or "peptized," once it is dispersed in an aqueous medium, to cause the individual colloidal MCC particles to deagglomerate and provide optimum suspension properties. Activation of a stabilizer system containing colloidal microcrystalline cellulose often requires high levels of shear, such as provided by commercial mixing devices like propeller mixers or homogenizers. These procedures are feasible for stabilizing agents intended for use in commercially-prepared drinks but are not practical for home use.

Stabilizers intended for home use or vending machine use, however, should be capable of being activated by simple spoon stirring. The stringency of this requirement can be appreciated only if it is recognized that rapid dispersion and long-term suspension of cocoa particles in an aqueous medium is a severe test for any solids stabilizing agent.

One commercially-available stabilizer intended for home use instant mixes is that described in McGinley, U.S. Pat. No. 4,311,717 and marketed under the brand name Microquick ®. It contains colloidal MCC in combination with milk solids or whey. Although this stabilizer normally provides satisfactory functionality, nevertheless stabilizer systems for certain end-use applications such as instant chocolate drink mixes intended for vending machine use, must be capable of being activated with only simple spoon stirring. The stabilizing agent of this invention is capable of satisfying this need.

SUMMARY OF THE INVENTION

The present invention is a stabilizing agent, useful as a rapid dispersing and suspending agent for solids in an aqueous medium, which comprises a coprocessed, co-dried powdered composition containing colloidal microcrystalline cellulose; starch, in an amount less than the weight of colloidal microcrystalline cellulose but sufficient in amount to activate the colloidal microcrystalline cellulose in an aqueous medium, and thus promote its rapid peptization with minimal agitation of the aqueous medium; and a non-thickening, water-soluble diluent for the microcrystalline cellulose in an amount such that the weight ratio of diluent to colloidal microcrystalline cellulose is within the range of about 0.6:1 to 9:1.

By the term "diluent" as used herein, is meant any water-soluble, non-thickening adjuvant which minimizes the compaction of dried MCC and thus aids in the rapid redispersion of the claimed stabilizing agent under minimal energy conditions. While applicants do not wish to be bound by any particular theory, it is believed that the diluent works by preventing the formation of difficult-to-redisperse compacted MCC when it is dried to form the powdered stabilizing agent of this invention. That is to say, while the compaction of MCC microcrystals when dried may not present a serious problem if they are to be later redispersed by high energy mixing, this can be a problem when the MCC is intended to be rapidly redispersed by mixing it with very little energy, e.g. with a spoon. Thus, as an essential feature of this invention it has been found necessary to include a substance which aids in preventing the compaction of MCC under these conditions but which is compatible with the uses to which the composition of this invention is to be put. While this substance may be alternatively characterized as a binder, filler, or extender, for purposes of this disclosure it will be designated as a diluent, i.e. an adjuvant which aids in the reconstitution of MCC in an aqueous medium with minimal energy.

It should be noted, however, that although the diluent serves to prevent compaction of the MCC when it is dried, comparative examples A-G below demonstrate that this component alone will not prevent compaction of MCC. In other words, unless starch is also present to help peptize and disperse the MCC, under the given conditions of shear (mixing), compaction will take place regardless. Therefore, it is actually the combined effect of the two components with MCC which provides the efficacy of the composition as shown in Tables I and II.

The stabilizing agent is preferably a spray dried composition.

The colloidal microcrystalline cellulose is preferably microcrystalline cellulose intimately associated with a minor amount, e.g., 3–15%, of sodium carboxymethyl cellulose as a dispersant aid.

The starch is preferably a low amylose starch. The concentration of starch in the stabilizing agent should be less than that amount which causes gelation-like thickening when the agent is employed in an aqueous medium. The starch is preferably present in an amount such that the weight ratio of colloidal microcrystalline cellulose to starch is within the range of about 3:2 to 7:1.

The third component of the stabilizing agent, the non-thickening, water-soluble diluent, is preferably selected form the group consisting of maltodextrin, whey and non-fat dry milk, but may include any compatible, food quality adjuvant which prevents the compaction of MCC microcrystals.

The stabilizing agent of this invention is particularly suited for use in dry mix instant chocolate drink formulations that are reconstituted with hot water. The amount of stabilizing agent used should be sufficient to yield a reconstituted beverage that contains about 0.5–3.0 wt. %, preferably about 0.5–1.5 wt. % colloidal microcrystalline cellulose.

DETAILED DESCRIPTION

The stabilizing agent of this invention is especially useful for suspending cocoa solids in chocolate drink formulations that are prepared from dry mixes that are typically reconstituted with hot water. This stabilizing agent has the advantage of providing excellent dispersion and suspension of cocoa (or other) solids in aqueous media, with minimal stirring or agitation of the dry mix during reconstitution with water or other aqueous liquid. By "minimal mixing, stirring, or agitation", or "minimal energy" is meant that amount of energy which is provided by hand mixing with a spoon or the like, or by equivalent minimal agitation means provided by a dispensing machine.

Although the stabilizing agent is best suited for use in suspending cocoa solids, it is believed equally useful in other food and non-food aqueous solids suspension systems that require rapid reconstitution or preparation from a dry powder mixture, under conditions permitting only a minimum of agitation or mixing to achieve complete solids dispersion and suspension. Examples of other applications for the stabilizing agent of this invention include foods such as instant dry mix gravies, cheese sauce mixes, soup mixes, and other foods or beverages obtained by mixing with water, particularly hot or boiling water, or other aqueous liquid, a dry mix containing solids to be suspended. Non-food uses include pharmaceutical preparations, suspension of paint or cosmetic pigments in aqueous media, stabilizing oil-in-water emulsions or foams, and the like.

The performance advantages accruing from the stabilizing agent of this invention are based on its three components, all of which should be of suitable quality for use in food; colloidal microcrystalline cellulose, a starch, and a non-thickening, water-soluble diluent, all of which are in intimate admixture with each other. The presence of both the starch and non-thickening water-soluble diluent are necessary to ensure that the colloidal microcrystalline cellulose-based stabilizing agent exhibits the desired rapid dispersing and suspending performance characteristics. Omission of either the starch or the diluent from the stabilizing agent results in unacceptable performance, as the comparative examples described below illustrate.

Colloidal microcrystalline cellulose is a recognized dispersion and suspension aid, useful in suspending solids in aqueous media. Commercially-available colloidal microcrystalline celluloses normally require a strong agitation or mixing, with a significant amount of shear, to ensure that the individual particles of microcrystalline cellulose are activated or "peptized," i.e., fully dispersed to provide good, long-term solids-suspending functionality. However, the presence of the non-thickening, water-soluble diluent and starch components in the stabilizing agent of this invention enables the colloidal microcrystalline cellulose to be rapidly activated or peptized, and dispersed, with minimal mixing, stirring or agitation, as defined above; that is to say, high shear agitation is unnecessary.

Colloidal microcrystalline cellulose suitable for use in this invention is microcrystalline cellulose which preferably is intimately associated with a minor amount of sodium carboxymethyl cellulose, typically about 3–15 wt. %. The sodium carboxymethyl cellulose is preferably one of low to medium viscosity, i.e., having a viscosity in a 1 wt. % aqueous dispersion of from 50–1000 centipoise at 20° C. A commercially-available colloidal microcrystalline cellulose of this type is Avicel ® RC-591 colloidal microcrystalline cellulose, available from FMC Corporation. Although sodium carboxymethyl cellulose is a preferred material, other colloids, e.g., xanthan or methyl cellulose, may also be used to make an acceptable colloidal microcrystalline cellulose.

The amount of colloidal microcrystalline cellulose in the stabilizing agent is not critical, but desirably is present in an amount of from around 25%–50%. However, greater or lesser amounts may also be present with satisfactory results. In end-use food applications for the stabilizing agent, the colloidal microcrystalline cellulose should be present in the final formulation of the reconstituted drink or food (e.g., obtained by mixing a dry mix containing the stabilizing agent with water) in an amount of about 0.5–3 wt. %, preferably 0.5–1.5 wt. %. The latter preferred range is especially suitable for chocolate drink formulations containing cocoa solids.

Just as important as the amount of colloidal microcrystalline cellulose in the stabilizing agent are the amounts of starch and diluent, relative to the colloidal microcrystalline cellulose. Only when colloidal microcrystalline cellulose is combined with starch and diluent in the specified amounts do the unexpected, superior results occur: rapid dispersion and suspension of solids without lumping when a dry mix containing solids and the stabilizing agent is gently mixed or stirred with water or other aqueous medium, thereby providing excellent long term (several hours) solids suspension in an aqueous medium without resorting to high shear mixing.

The second key component in the stabilizing agent composition is starch. The source of the starch is not critical and a wide variety of starches are satisfactory for use in this invention: corn, potato, wheat, rice, tapioca, and waxy maize starches, or starch-containing cereal flours such as wheat, flour, potato flour, etc.

Suitable starches that are commercially available include Melojel ® and Clearjel ® corn starches, Purity Gum 1773 waxy maize starch, Instant Pure-Flo F pregelatinized corn starch, all from National Starch and Chemical Company, Gelex ® pregelatinized corn starch from American Maize-Products Company, and Mira-sperse ™ starch from A. E. Staley Manufacturing Company.

The starch is preferably one that has a relatively low amylose content. The above-noted Purity Gum 1773 starch is one example of such low amylose starch. Stabilizing agent compositions containing a low amylose starch exhibit excellent solids stabilization performance over extended periods of time, i.e., solids remain suspended for several hours with no visible settling occurring.

Pregelatinized starches are also preferred, since such starches facilitate rapid peptization of the colloidal microcrystalline cellulose in cold water. Starches that are not pregelatinized are better suited for stabilizing agent formulations intended to be used in dry mixes that are reconstituted with warm or hot aqueous media, whose temperature is above the starch gelatinization temperature. Since the amount of starch employed in stabilizing agent composition of this invention is relatively small, gelatinization of non-pregelatinized starches occurs quickly once the stabilizing agent is contacted with warm or hot aqueous media.

The starch is employed in the stabilizing agent composition in small amounts, relative to the colloidal microcrystalline cellulose. The starch is present in an amount less than the weight of colloidal microcrystalline cellulose but at least sufficient in amount to activate or peptize the colloidal microcrystalline cellulose in an aqueous medium, with minimal mixing or agitation of the aqueous medium, e.g., simple stirring for less than a minute. Levels of starch below the minimum required to activate the colloidal microcrystalline cellulose will result in visible solids lumping and/or sedimentation occurring when the stabilizing agent is used in dry mix formulations that are reconstituted in an aqueous medium.

The starch is desirably present in amounts below that which causes gelation-like thickening when the stabilizing agent is employed in an aqueous medium. In certain end-use applications for the stabilizing agent, e.g., instant gravy mixes the starch may be present in amounts that result in a thickening of the aqueous medium. For chocolate drink formulations, the level of starch is desirably below that amount which causes an undesirable thickening of the chocolate beverage and/or which causes an undesirable starchy taste in the beverage.

The amount of starch is desirably adjusted so as to yield a weight ratio of colloidal microcrystalline cellulose to starch, in the stabilizing agent, that is in the range of about 3:2 to 7:1, and more desirably in the range of about 2:1 to 6:1. These ratio ranges normally yield optimal performance of the stabilizing agent, particularly when used in chocolate drink formulations containing cocoa solids.

The third essential component in the stabilizing agent of this invention is, as described above, a non-thickening, water-soluble diluent which prevents compaction of the dried MCC. The diluent should be non-thickening in aqueous media so as not to cause an unwanted increase in viscosity when the stabilizing agent is employed in an aqueous medium. The diluent should also be water-soluble, which facilitates activation of the stabilizing agent when the agent is employed in an aqueous medium, yet should permit the final product, i.e., the stabilizing agent, to dry to a powder-like form.

Suitable diluents include carbohydrates that are characterized by being non-thickening and water-soluble in aqueous media, e.g., dextrose, polydextrose, corn syrup solids, lactose, and the like. Less desirably, because of their lower melting point, there may also be used dextrose or fructose which thus require lower processing temperatures.

The preferred non-thickening water-soluble diluents are maltodextrin, whey and non-fat dry milk.

Maltodextrin is a polysaccharide obtained from hydrolysis of cereal solids; it usually is in powder form. The maltodextrin preferably has a dextrose equivalent of about 9-12, for taste and flavor considerations. Commercially-available maltodextrins suitable for use in this invention include Maltrin ® maltodextrins from Grain Processing Corporation and Amaizo Fro-Dex ® maltodextrins from American Maize-Products Company.

Whey is a powdered dairy product obtained by spray drying of whey by-product from cheese manufacture. Sweet whey powder, obtained from sweet (as opposed to sharp, acid-curd) cheese production, is preferred.

Non-fat dry milk (NFDM), also called milk solids non-fat (MSNF) or non-fat milk powder, is another powdered dairy product that may be employed as the preferred non-thickening, water-soluble diluent.

As set forth above, the water-soluble, non-thickening diluent should be employed in the stabilizing agent composition in such amounts as to prevent compaction of the MCC when it is dried. The weight ratio of diluent to colloidal microcrystalline cellulose is within the range of about 0.6:1 to 9:1. Relatively large amounts of diluent, i.e., diluent to colloidal microcrystalline cellulose ratios of around 7:1 to 9:1 may be employed when it is required that corresponding large quantities of stabilizing agent to be used in end-use applications. These ratios are necessary to achieve the desired level of colloidal microcrystalline cellulose (0.5-1.5 wt. %) that is preferably employed in an aqueous medium containing solids to be suspended. However, the diluent to colloidal microcrystalline cellulose weight ratio is preferably maintained within the range of about 0.6:1 to 4:1.

The stabilizing agent composition of this invention is a dry powder. The powder preferably contains relatively fine particles, the exact size of which are not critical as long as they disperse readily. Particle sizes on the order of about 10-40 microns, which facilitate rapid activation or peptization of the colloidal microcrystalline cellulose when the agent is introduced to an aqueous medium are preferred. However, the stabilizing agent may also consist of or contain coarse-sized particles, e.g., up to about 250 microns in size. Such coarse particles may be granular particles or agglomerates or aggregates of fine-sized particles are desirable in some preparations in that they sink quickly and are easily wetted by the aqueous medium.

The stabilizing agent is prepared by coprocessing and codrying the three components described above to yield a product in dry powder form. This processing procedure yields a dry product in which the three components are in intimate association or admixture with each other. Conventional spray drying of an aqueous slurry containing colloidal microcrystalline cellulose, starch and water-soluble, non-thickening diluent is the preferred method for coprocessing and codrying the components to yield the powdered stabilizing agent.

Coprocessing and codrying via other types of equipment are also feasible, although a satisfactory stabilizing agent is not as easily obtained as with conventional spray drying.

Two techniques believed to be suitable for preparing the coprocessed, codried stabilizing agent composition of this invention are (i) fluid bed drying, in which a slurry containing the three components is sprayed onto heated particles suspended in a fluidized bed, to yield an agglomerated particulate product, and (ii) fluidized spray drying, in which a fluidized bed zone in the lower portion of a spray dryer cone propels particles up into the spray zone where the incoming slurry is atomized into small droplets and dried.

In the preparation procedure using spray drying, a water slurry of colloidal microcrystalline cellulose, e.g., Avicel® RC-591 microcrystalline cellulose, in a suitable vessel is subjected to high shear agitation, with a high speed mixer or blender, centrifugal pump or homogenizer. The starch and non-thickening, water-soluble diluent, e.g., maltodextrin, are then introduced, preferably together, to the aqueous mixture, in appropriate amounts relative to the colloidal microcrystalline cellulose and subjected to conventional mixing to ensure that the starch is uniformly distributed throughout the mixture and that the diluent is substantially all dissolved. The aqueous mixture is next introduced to a conventional spray drying apparatus, where it is atomized into droplets and dried to yield the stabilizing agent composition in the form of a fine powder.

The stabilizing agent composition may then be utilized in any of a variety of applications, in which a dry powder formulation containing the stabilizing agent is reconstituted with an aqueous medium, to provide good dispersion and suspension of fine solids contained in the formulation under conditions that allow only minimal agitation or low-shear mixing.

A preferred end-use for the stabilizing agent is in dry "instant" chocolate drink mixes, in which the cocoa solids desirably remain suspended in the beverage once the mix is reconstituted with hot water and with simple spoon stirring for a few seconds. Such dry mix instant chocolate mixes typically contain cocoa powder, sugar, an emulsifier (for the cocoa solids), and stabilizing agent (for dispersion and suspension of the cocoa solids). A representative dry mix would ordinarily be combined with hot water in amounts to yield about 1 wt. % cocoa solids, 8% sugar, and sufficient stabilizer to yield 1 wt. % colloidal microcrystalline cellulose is the reconstituted hot drink. Such chocolate drink dry mix formulations, like other formulations containing the stabilizing agent of this invention, may contain a wide variety of other conventional ingredients or additives, such as flavoring agents, coloring agents, preservatives, and the like.

EXAMPLES

The following generalized procedure was used to prepare the spray-dried stabilizing agent compositions described in detail below.

Avicel® RC-591 colloidal microcrystalline cellulose, described above, a white powder, was added to cold water contained in a stainless steel vessel in an amount sufficient to yield about 3-4 wt. % colloidal microcrystalline cellulose in the aqueous medium. The aqueous medium was then mixed for about thirty minutes using a propeller mixer to assure good dispersion of the microcrystalline cellulose. After this mixing, an aqueous gel formed in the aqueous medium at rest.

The desired amounts of starch and non-thickening, water-soluble binder, both in powder form, were then added to the aqueous gel and mixing contained for another fifteen minutes to ensure good dispersion of the starch and solubilization of the binder.

The aqueous medium containing the three components was next homogenized, in a Mouton-Gaulin homogenizer at 2000 psi in the first stage and 500 psi in the second stage. This procedure resulted in an aqueous slurry in which the colloidal microcrystalline cellulose and starch were thoroughly dispersed to provide a homogeneous mixture suitable for spray drying.

The homogenized aqueous slurry was spray dried using a laboratory scale (3 ft. diameter) Bowen spray dryer. Inlet temperature of the spray dryer was set at about 145° C., and the slurry feed rate to the dryer was adjusted to provide an outlet temperature of about 80° C. Spray atomization was accomplished with a 0.01 in. nozzle operated at an atomizing air pressure of about 90 psi.

The resultant spray-dried stabilizing agent powder was evaluated for efficacy in a dry mix chocolate drink formulation, obtained by dry blending of the following components: stabilizing agent, cocoa, sugar (sucrose), and Cremora ™ non-dairy creamer (Borden, Inc.) as a cocoa whitening agent. The dry mix formulation was then reconstituted by spoon stirring for 15-30 seconds in hot water, at a temperature of 93° C. (200° F.), to yield the following composition:

stabilizing agent (in an amount sufficient to provide about 1 wt. % colloidal microcrystalline cellulose in the reconstituted drink)
cocoa - 1 wt. %
sucrose - 8.1 wt. %
Cremora non-dairy creamer - 1.6%

Sufficient hot water was used to provide the above-noted component concentrations. The relative amounts of the components in the dry mix formulation were determined by reverse calculation from the above-noted reconstituted drink composition.

The amount of stabilizing agent employed typically was within the range of 2.5-4 wt. %, usually about 3 wt. %. The exact amount depended on the concentration of colloidal microcrystalline cellulose present in the stabilizing agent, which in turn determined the amount of agent needed to provide 1 wt. % colloidal microcrystalline cellulose in the reconstituted drink.

The efficacy of the stabilizing agent in the chocolate drink formulation was measured by the ability of the stabilizing agent to maintain the 1 wt. % cocoa solids in suspension. Suspension stability was determined by observation of the chocolate drink six hours after the initial spoon stirring mixing; the absence of sediment indicated good stability. Microscopic examination of the chocolate drink was also carried out to determine the degree of microcrystalline cellulose particle dispersion, since the presence of undispersed microcrystalline cellulose particle clusters or aggregates ordinarily correlates well with unsatisfactory solids suspension performance.

Several examples of the stabilizing agent of this invention were prepared following the procedure just described. Comparative examples were also carried out under similar conditions as a means of illustrating the criticality of various elements of the inventive stabilizing agents. Pertinent data for all of these examples are reported in Tables I and II.

The examples illustrate the use of various starches and of three non-thickening, water-soluble diluents; namely, maltodextrin, whey and non-fat dry milk. All examples employed Avicel® RC-591F (food grade) colloidal microcrystalline cellulose (available from FMC Corporation) for the colloidal microcrystalline cellulose component of the stabilizing agent.

Various concentration levels for the three components of the stabilizing agent are likewise illustrated.

Performance results for the exemplified stabilizing agents, when used in a standardized dry mix chocolate drink formulation reconstituted with hot water, are included in Table II, and these data were obtained using the general procedures described earlier.

Examples 1-4 in the Tables illustrate the use of four different starches in a spray-dried stabilizing agent containing colloidal microcrystalline cellulose, starch and non-fat dry milk as the diluent. The resultant stabilizing agents gave similar, very good performance characteristics in the standardized chocolate drink formulation.

Comparative Examples A and B involved substitution of hydroxypropylmethyl cellulose and locust bean gum, respectively, in lieu of the starch of Examples 1-4. Comparative Example C was a spray-dried material containing no starch, only colloidal microcrystalline cellulose and non-fat milk solids as the binder. All of these comparative products were unsatisfactory when evaluated in the standardized chocolate drink formulation.

Example 5 illustrates a stabilizing agent composition utilizing why as the diluent and Example 7 illustrates a stabilizing agent composition containing maltodextrin as the diluent. The component proportions of Examples 1, 5 and 7 are identical, differing only in the type of diluent used. Performance results of these stabilizing agents in the chocolate drink formulation were uniformly very good.

Examples 6-11 illustrate stabilizing agents containing colloidal microcrystalline cellulose (CMCC), starch and maltodextrin, in which the CMCC:starch ratio was varied from 3:1 to 7:1. All gave very good performance results in the chocolate drink formulation. Comparative Example D illustrates an excessively low starch ratio, i.e., 8:1 CMCC:starch, that gave unsatisfactory solids stabilization performance. In Comparative Example F, the starch was omitted altogether and solids stabilization performance in the chocolate drink formulation was poor. In both of these examples, the low level and absence of starch appear to adversely affect activation or peptization of the colloidal microcrystalline cellulose in the spray-dried compositions.

Examples 12-15 illustrate stabilizing agents containing colloidal microcrystalline cellulose (CMCC), starch and maltodextrin, in which the diluent:CMCC ratio was varied from 2.8:1 to 0.8:1. All gave very good performance results in the chocolate drink formulation. Comparative Example F illustrates a maltodextrin diluent:CMCC ratio of 0.5:1; solids stabilization performance was marginal. Comparative Example G illustrates a very low maltodextrin diluent:CMCC ratio of 0.1:1, Comparative Example H illustrates a composition having no diluent whatsoever. Both of these comparative examples exhibited unsatisfactory solids stabilization performance when the compositions were evaluated in the chocolate drink formulation.

| Example | Components | Component Concentration (wt. %) | CMCC: Starch Wt Ratio | Diluent: CMCC* Wt Ratio |
|---|---|---|---|---|
| 1 | Colloidal microcrystalline cellulose (CMCC) | 30 | | |
| | Melojel ® starch | 10 | | |
| | Non-fat dry milk (NFDM) | 60 | 3:1 | 2:1 |
| 2 | CMCC | 30 | | |
| | Clearjel ® starch | 10 | | |
| | NFDM | 60 | 3:1 | 2:1 |
| 3 | CMCC | 30 | | |
| | Gelex ® starch | 10 | | |
| | NFDM | 60 | 3:1 | 2:1 |
| 4 | CMCC | 30 | | |
| | Pure-Flo F starch | 10 | | |
| | NFDM | 60 | 3:1 | 2:1 |
| Comparative A | CMCC | 30 | | |
| | Hydroxypropylmethyl cellulose | 10 | | |
| | NFDM | 60 | 3:1 | 2:1 |
| Comparative B | CMCC | 30 | | |
| | Locust bean gum | 10 | | |
| | NFDM | 60 | 3:1 | 2:1 |
| Comparative C | CMCC | 25 | | |
| | NFDM | 75 | no starch | 3:1 |
| 5 | CMCC | 30 | | |
| | Melojel starch | 10 | | |
| | Whey | 60 | 3:1 | 2:1 |
| 6 | CMCC | 26.7 | | |
| | Melojel starch | 13.3 | | |
| | Maltodextrin | 60 | 2:1 | 2.2:1 |
| 7 | CMCC | 30 | | |
| | Melojel starch | 10 | | |
| | Maltodextrin | 60 | 3:1 | 2:1 |
| 8 | CMCC | 32 | | |
| | Melojel starch | 8 | | |
| | Maltodextrin | 60 | 4:1 | 1.9:1 |
| 9 | CMCC | 33.3 | | |
| | Melojel starch | 6.7 | | |
| | Maltodextrin | 60 | 5:1 | 1.8:1 |
| 10 | CMCC | 34.3 | | |
| | Melojel starch | 5.7 | | |
| | Maltodextrin | 60 | 6:1 | 1.8:1 |
| 11 | CMCC | 35 | | |
| | Melojel starch | 5 | | |
| | Maltodextrin | 60 | 7:1 | 1.7:1 |
| Comparative D | CMCC | 35.6 | | |
| | Melojel starch | 4.4 | | |
| | Maltodextrin | 60 | 8:1 | 1.7:1 |
| Comparative E | CMCC | 40 | | |
| | Maltodextrin | 60 | no starch | 1.5:1 |
| 12 | CMCC | 25 | | |
| | Melojel starch | 5 | | |
| | Maltodextrin | 70 | 5:1 | 2.8:1 |
| 13 | CMCC | 30 | | |
| | Melojel starch | 6 | | |
| | Maltodextrin | 64 | 5:1 | 2.1:1 |
| 14 | CMCC | 51.4 | | |
| | Melojel starch | 8.6 | | |
| | Maltodextrin | 40 | 6:1 | 1.0:1 |
| 15 | CMCC | 50 | | |
| | Melojel starch | 10 | | |
| | Maltodextrin | 40 | 5:1 | 0.8:1 |
| Comparative F | CMCC | 58.3 | | |
| | Melojel starch | 11.7 | | |
| | Maltodextrin | 30 | 5:1 | 0.5:1 |
| Comparative G | CMCC | 75 | | |
| | Melojel starch | 15 | | |
| | Maltodextrin | 10 | 5:1 | 0.1:1 |
| Comparative H | CMCC | 83.3 | | |
| | Melojel starch | 16.7 | 5:1 | no binder |

*CMCC = colloidal microcrystalline cellulose

TABLE II

| Example | Stabilizing Agent Concentration (wt %)** | Stability of Dispersed Cocoa (after 6 hours) | CMCC* Dispersion |
|---|---|---|---|
| 1 | 3.3 | good; stable | very good |

TABLE II-continued

| Example | Stabilizing Agent Concentration (wt %)** | Stability of Dispersed Cocoa (after 6 hours) | CMCC* Dispersion |
|---|---|---|---|
| 2 | 3.3 | good; stable | very good |
| 3 | 3.3 | good; stable | very good |
| 4 | 3.3 | good; stable | very good |
| Comparative A | 3.3 | poor; dense, compacted sediment | poor; undispersed CMCC aggregates |
| Comparative B | 3.3 | poor; dense, compacted sediment | poor; undispersed CMCC aggregates |
| Comparative C | 4.0 | poor; dense, compacted sediment | poor; undispersed CMCC aggregates |
| 5 | 3.3 | good; stable | very good |
| 6 | 3.75 | good; stable | very good |
| 7 | 3.3 | good; stable | very good |
| 8 | 3.1 | good; stable | very good |
| 9 | 2.9 | good; stable | very good |
| 10 | 2.9 | good; stable | good |
| 11 | 2.9 | good; stable | good |
| Comparative D | 2.8 | fair; loose, voluminous sediment | fair, partially dispersed CMCC aggregates |
| Comparative E | 2.5 | poor; dense, compacted sediment | poor; undispersed CMCC aggregates |
| 12 | 4.0 | good; stable | very good |
| 13 | 3.3 | good; stable | very good |
| 14 | 2.0 | good; stable | good |
| 15 | 2.0 | good; stable | good |
| Comparative F | 1.7 | fair; loose voluminous sediment | fair; partially dispersed CMCC aggregates |
| Comparative G | 1.3 | poor; dense, compacted sediment | poor; undispersed CMCC aggregates |
| Comparative H | 1.2 | poor; dense, compacted sediment | poor; undispersed CMCC aggregates |

*CMCC — colloidal microcrystalline cellulose
**Corresponds to 1% CMCC in formulated chocolate drink

We claim:

1. A stabilizing agent, useful as a rapid dispersing agent for suspending solids in an aqueous medium, which comprises a coprocessed, codried powdered composition containing
   (i) colloidal microcrystalline cellulose;
   (ii) starch, in an amount less than the weight of colloidal microcrystalline cellulose but sufficient in amount to activate the colloidal microcrystalline cellulose in an aqueous medium, promoting its rapid peptization with minimal agitation of the aqueous medium; and
   (iii) a non-thickening, water-soluble diluent, in an amount such that the weight ratio of diluent to colloidal microcrystalline cellulose is within the range of about 0.6:1 to 9:1.

2. The stabilizing agent composition of claim 1 which comprises a spray-dried composition.

3. The stabilizing agent composition of claim 1 wherein the colloidal microcrystalline cellulose is microcrystalline cellulose intimately associated with a minor amount of sodium carboxymethyl cellulose.

4. The stabilizing agent composition of claim 1 wherein the starch is a low amylose starch.

5. The stabilizing agent composition of claim 1 wherein the starch is a pregelatinized starch.

6. The stabilizing agent composition of claim 1 wherein the concentration of starch is maintained below that amount which causes gelation-like thickening when the agent is employed in the aqueous medium.

7. The stabilizing agent composition of claim 1 wherein the colloidal microcrystalline cellulose and starch are present in amounts such that the weight ratio of colloidal microcrystalline cellulose to starch is within the range of about 3:2 to 7:1.

8. The stabilizing agent composition of claim 1 wherein the colloidal microcrystalline cellulose and starch are present in amounts such that the weight ratio of colloidal microcrystalline cellulose to starch is within the range of about 2:1 to 6:1.

9. The stabilizing agent composition of claim 1 wherein the non-thickening, water-soluble diluent is a carbohydrate.

10. The stabilizing agent composition of claim 1 wherein the non-thickening, water-soluble diluent is selected from the group consisting of maltodextrin, whey, and non-fat dry milk.

11. The stabilizing agent composition of claim 1 wherein the diluent and colloidal microcrystalline cellulose are present in amounts such that the weight ratio of diluent to colloidal microcrystalline cellulose is within the range of about 0.6:1 to 4:1.

12. An aqueous food formulation containing the stabilizing agent composition of claim 1 in an amount sufficient to provide about 0.5–3.0 weight % colloidal microcrystalline cellulose therein.

13. The aqueous food formulation of claim 12 wherein the food formulation is a reconstituted aqueous chocolate or cocoa beverage that contains about 0.5–1.5 weight % colloidal microcrystalline cellulose.

* * * * *

UNITED STATES PATENT AND TRADEMARK OFFICE
CERTIFICATE OF CORRECTION

PATENT NO. : 4,980,193

DATED : December 25, 1990

INVENTOR(S) : Domingo C. Tuason, Jr., Emanuel J. McGinley

It is certified that error appears in the above-identified patent and that said Letters Patent is hereby corrected as shown below:

Title page, Assignee, "FMX Corporation" should read --FMC Corporation--.

Signed and Sealed this

Nineteenth Day of May, 1992

Attest:

DOUGLAS B. COMER

*Attesting Officer*   *Acting Commissioner of Patents and Trademarks*